United States Patent [19]

Anderson

[11] 4,346,540
[45] Aug. 31, 1982

[54] DEVICE RELATING TO BUILDING FRAMEWORKS

[76] Inventor: Leif Anderson, Bögatan 39 A, 412 72 Göteborg, Sweden

[21] Appl. No.: 192,591
[22] PCT Filed: Aug. 8, 1979
[86] PCT No.: PCT/SE79/00167
§ 371 Date: Apr. 9, 1980
§ 102(e) Date: Apr. 8, 1980
[87] PCT Pub. No.: WO80/00356
PCT Pub. Date: Mar. 6, 1980

[30] Foreign Application Priority Data

Aug. 9, 1978 [SE] Sweden .................. 7808502

[51] Int. Cl.³ .................. E04B 1/24; E04B 1/54
[52] U.S. Cl. .................. 52/274; 52/648; 52/236.6; 211/182
[58] Field of Search .................. 52/648, 282, 236.3, 52/236.6, 234, 236.9, 272, 274, 280, 283, 645, 646, 720, 721, 726; 211/204, 205, 182; 403/217

[56] References Cited

U.S. PATENT DOCUMENTS

| | | | |
|---|---|---|---|
| 3,391,795 | 7/1968 | Finlayson | 211/182 X |
| 3,429,092 | 2/1969 | Perry et al. | 52/648 |
| 3,513,606 | 5/1970 | Jones | 52/648 X |
| 3,818,671 | 6/1974 | Matsushita et al. | 52/648 X |
| 3,971,182 | 7/1976 | Donahue et al. | 52/282 |
| 4,024,686 | 5/1977 | Gronert | 52/282 |
| 4,125,973 | 11/1978 | Lendrihas | 52/648 X |
| 4,129,975 | 12/1978 | Gabriel | 52/648 |

Primary Examiner—J. Karl Bell

[57] ABSTRACT

Device relating to building frameworks which comprise a foundation (2, 3), supported by the foundation, a number of vertical uprights (1) in the longitudinal direction divided in elements (6, 7) joined to the end of each other to form the respective complete upright (1), a number of substantially horizontal beams (4), provided for the support of such area covering elements as floor structure elements (5) at least partly positioned above each other to form several stories of the building, which beams (4) are provided with their ends to be supported by the upright elements where they are joined together along the respective upright, and coupling means (8) in the points where the upright elements are joined together and including elements (19, 25) for attaching of the ends of the respective upright elements (6, 7) to each other and elements (18, 22) for supporting of the beam or beams (4) connecting to the coupling means (8). The upper end of the upright element (6) which is the lower one in the respective joint between two upright elements, at the sides extending from the end is permanently provided with the supporting element (18, 22) for the beams preferably for four beams in right angle to each other and at its end provided with a first part (19) of the element for attaching the ends of the upright elements to each other and provided to cooperate with a second part (25) of said attaching element provided at the lower end of the upright element (7) positioned as an upper element in the joint between the two upright elements.

9 Claims, 10 Drawing Figures

DEVICE RELATING TO BUILDING FRAMEWORKS

TECHNICAL FIELD

The object of the present invention is a device relating to building frameworks which comprise a foundation, supported by the foundation, a number of vertical uprights in the longitudinal direction divided in elements joined to the end of each other to form the respective complete upright, a number of substantially horizontal beams provided for the support of such area covering elements as floor structure elements at least partly positioned above each other to form several stories of the building, which beams are provided with their ends to be supported by the upright elements where they are joined together along the respective upright, and coupling means in the points where the upright elements are joined together and including elements for attaching of the ends of the respective upright elements to each other and elements for supporting of the beam or beams connecting to the coupling means.

PRIOR ART

Different kinds of extents of prefabrication find an application in connection with house construction work. By means of such prefabrication, part of the work for the construction of the building instead of being carried out at the site where the building will be erected can be assigned to the site of prefabrication, by way of example a factory. By such an arrangement the time of erection of the building can be shortened, and a more accurate workmanship, lower costs and/or a freer choice of material can be achieved. The above represents a few examples only of the benefits and changed conditions, which can be obtained by prefabrication and different forms and extents of prefabrication can be chosen according to the benefits and changes pursued. An advantage which is desirable to reach in most cases is the possibility to use the prefabricated parts in as many combinations as possible at different parts of the building and to the greatest extent independent of variations in layout and size of the building. It is also usually of advantage if the elements and units can satisfy several functions at the same time, which means a saving in the manufacturing cost.

TECHNICAL PROBLEM

The object of the present invention is to provide a device for use in building framework, which device makes it possible to use the included units in many different ways and in many different cases of varied applications.

It is another object of the invention to provide a device which can satisfy several functions at the same time, which means a saving in manufacturing cost.

THE SOLUTION

The objects of the invention are obtained by providing the device in such a way that the upper end of the upright element, which is the lower one in the respective joint between two upright elements, is provided in a permanent arrangement with supporting elements for the beams preferably for four beams in right angles to each other and at its end provided with a first part of the element for attaching the ends of the upright elements to each other and provided to cooperate with a second part of said attaching element provided at the lower end of the upright element positioned as an upper element in the joint between the two upright elements.

ADVANTAGES

The aim of the invention is to provide a building framework which can be easily mounted and when so is desired even demounted substantially without use of tools at least no special tools. To a high extent the invention also provides a jointing of the elements to each other without use of separate components. Thus, the jointing of the upright elements, the beams, columns and intermediate beams can be made without any separate components in the form of screws or similar. Thereby it is accomplished that the framework can be erected in a very short time without the risk that any components are missing at the erection work. The larger elements are not so easily missed while smaller components as screws and similar can be lost. The different elements are to a high extent adapted for packing in containers and the uprights are for this purpose not provided with any extending parts along its sides. At these sides arranged dogs are possible to pivot inwards. The intention of the invention is therefore that the framework should be suitable for erecting on distant places difficult to reach. As the framework is possible to entirely demount and is comprising elements which are packable close together it will take up as small space as possible by transport and the intention is that even a relatively large building could be transported in one or a few containers of standard size. As small components to a great extent are omitted and when such components are included they comprise only standard screws and similar. The risk of an incomplete building kit is nearly eliminated which is of a very great importance if the transportation distance is long. As the framework is possible to erect in a short time it is possible to promptly get a "shell" inside of which the work for the finishing of the building can be made under a roof. These circumstances are of great importance in connection with the construction of buildings in areas with a hard climate.

BRIEF DESCRIPTION OF DRAWINGS

In the following an embodiment of the invention will be described, reference being made to the accompanying drawings, in which.

Figure 1:
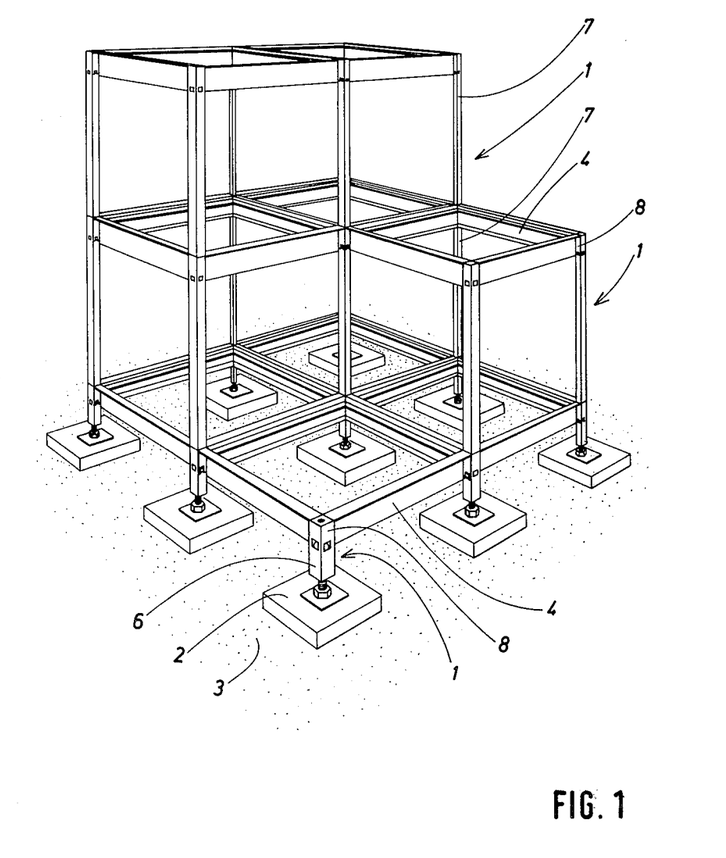
FIG. 1 is a perspective view of a framework.

According to FIG. 1 the main structure of the framework comprises a number of vertical uprights 1 which by means of plates 2 are supported by a foundation 3. The foundation can be the ground, on which the plates 2 rest directly. However, a special foundation can also be prepared, by way of example in the form of a foundation plate, a basement, a pile work, or any other foundation known in the building technique. A number of beams 4 extend between the vertical uprights 1. The beams 4, which are horizontal, can project in four directions from the uprights and then form angles of 90° and 180° respectively relative to each other. The number of beams projecting from an upright is, however, depending upon the location of the upright in the design of the building body. Thus, two beams project from an upright located in a corner of the building forming a right angle with each other, whereas an upright located between corners of the building along the outer wall of the same can support two beams forming an angle of 180° relative to each other or three beams forming an angle of 90° relative to each other, one of the beams in this latter case projecting inwards in direction to the center of the building body. An upright located in the center of the building body can support four beams, but two or three beams can also occur.

The beams 4 in their turn support elements 5, which are intended to form or support such horizontal surfaces of the building as floors or ceilings. In the following the elements 5 are called floor structure elements. However, at the top of the building they can form a roof. The floor structure elements 5 are as mentioned supported by the beams 4 and by this arrangement extend in a straight line between their bearing points on the beams. However, in connection with roof elements, the elements can be of triangular shape in order to form an inclined roof, or they can exhibit an angular shape in order to form an inclined roof as well as an inclined ceiling. However, these variants will be obvious for a person skilled in the art and for simplicity's sake the element 5 will therefore in the following only be described as a floor structure element.

As is moreover evident from FIG. 1, the uprights have different length. Thus, there are uprights, which extend through several floors, and in such connection they support more than two layers of beams which are interspaced by the height of one story. When an upright only extends through one story between two floor structure elements and down to the plate 2, the uprights only support two layers of beams. As is also evident, certain uprights terminate already at the first floor structure, and thus they extend only between the plate 2 and the first layer of beams 4.

Thus the uprights can have different length depending upon the type of the building and the location of the uprights. However, in order to limit the number of different elements forming part of the assembly, which is of advantage, as seen from a manufacturing and handling viewpoint, the uprights are divided up in longitudinal elements. Taking a certain roof height as standard, most needs may be satisfied by means of two types of upright elements, viz. lower elements extending from the plate to the first layer of the beams 4, in the following called the basement upright elements, and the elements extending between two stories and in the following called the story upright elements 7. Each upright element 6 and 7 at its upper end supports a coupling device 8, which is arranged to make possible the attachment for one, two, three or four ends of beams 4 to the upright element at the same time, and they also make possible the jointing of the lower end of the following upright element to said upper end. The ends of the beams 4 in their turn support means, which are arranged to cooperate with the coupling devices 8. In the following the upright elements will be described more in detail, as well as their coupling devices and the beams with their equipment and a few additional details.

Figure 3:
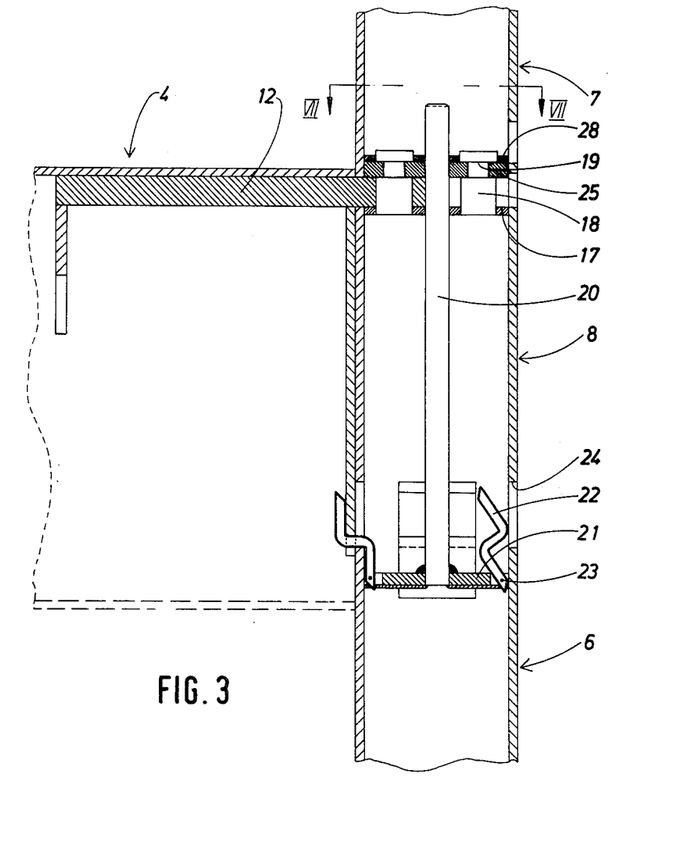
FIG. 3 is a view of a central cross-section through a coupling device according to the invention.
Figure 4:
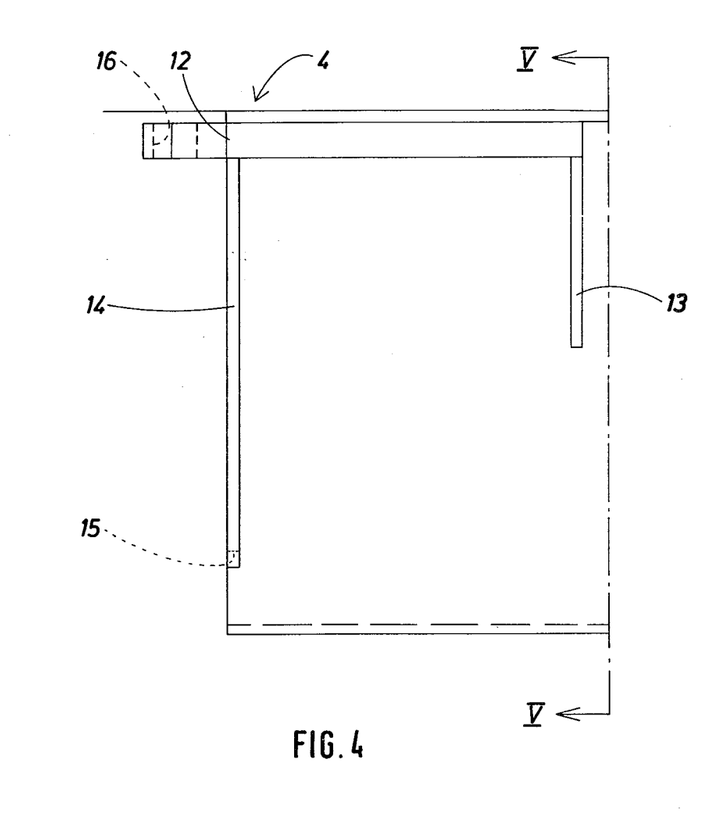
FIG. 4 is a view of a cross-section through a beam forming part of the framework taken along the line IV—IV in FIG. 5.
Figure 5:
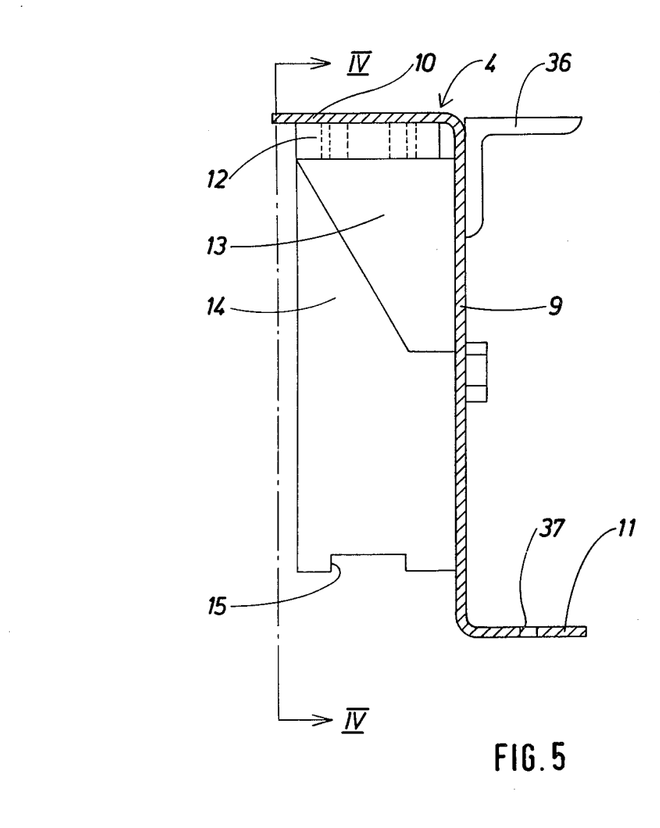
FIG. 5 is a view of a cross-section of a beam taken along the line V—V in FIG. 4.

According to FIGS. 4 and 5 the beams 4 exhibit a Z-shape with a web 9, an upper flange 10 and a lower flange 11. To the underside of the upper flange 10 a plate 12 is attached, which with a pointed portion (see FIG. 6) projects outside of the end of the beam, and which is provided with a hole 16. The plate 12 is supported by a welded-on flange 13 and by an end plate 14, which occupies a position at the end of the beam 4, and which in its bottom portion exhibits a recess 15. The coupling devices 8 are shown in detail in FIG. 3. Each coupling device is divided up in two parts, one of them being located at the upper end of the upright elements 6 and 7 and the other one located at the bottom portions of the upright elements. The coupling parts located at the upper end of the upright elements comprise a plate 17 inserted slightly below the end of the upright in the square upright profile, where it is fastened by welding, and four pins 18 projecting from said plate 17 and each one provided with a groove 19. A bar 20 extends from the plate both in upwards and downwards direction, the lower end of which bar carries a supporting plate 21, in which four Z-shaped dogs 22 are pivoted, which can be pivoted round shafts 23 fastened to the supporting plate 21. Each one of the dogs 22 is right in front of one of the sides of the square profile and right in front of an opening 24 in said side. According to FIG. 6 the dogs 22 can occupy a swung-out position illustrated to the left in the figure, and a swung-in position illustrated to the right in the figure, when the dog is inside the side of the upright profile.

Figure 7:
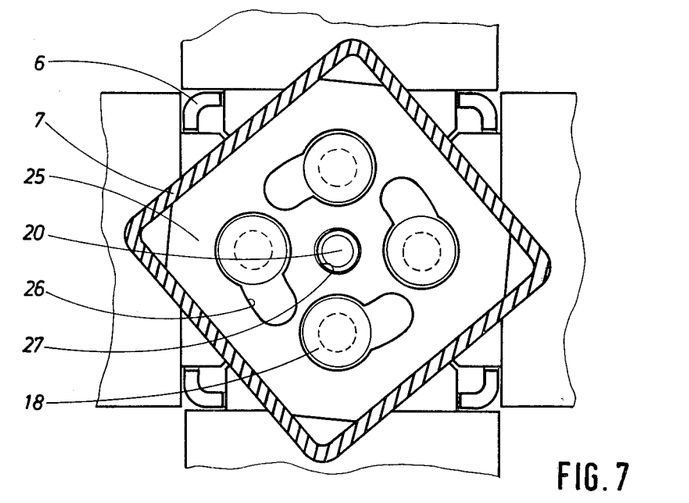

The portion of the coupling device 8, which is at the lower end of the upright, comprises a plate 25 with four keyhole-shaped holes 26 (see FIG. 7), which plate is welded to the upright, said holes exhibiting an oblong narrower portion and a circular wider portion. The circular wider portion can be slipped over the pin 18, whereas the oblong narrower portion fits to the waist, which is formed by the groove 19, and this portion of the hole 26 cannot fit to the outer portion of the pin 18. In the plate 25 there is in addition a centerhole 27 for the bar 20. On top of the plate 25 there is a second plate 28, which differing from the plate 25, which is welded to the lower end of the upright element, is completely loose and by its own weight rests on the plate 25. This loose plate 28 exhibits four holes (see FIG. 8), which are so large that they can slip over the outer parts of the pins 18. These holes are right in front of the terminal of the narrower portions of the holes 26, thus concentrically to the semicircular terminations of the same. The plate 28 is in the position mentioned guided because of the fact that it is square and fits to the square profile of the upright element. The plate 28 is accessible from the outside through openings 30 in the upright element. As is clearly evident from the figures, especially FIG. 8, the plate 17 occupies a recessed position in the upper end of the upright element, and recesses 31 (FIG. 8) are made in the sides of the upright elements, which recesses are so deep that the plates 12 on the beams 4 can occupy a position slightly below the remaining corners 32, which represent the extreme termination of the upright. The short distance between the plates 12 and the end of the corner portions 32, is essentially as great as the measure with which the plate 25 projects below the lower end (see FIG. 3) of the upright element. The plate 25 has a somewhat slighter thickness than the measure of the width of the groove 19.

The principal parts of the framework and the coupling devices for the uprights and the beams have now been described. However, in order to form a complete framework, additional elements are required. Thus the upright 6 at their lower ends exhibit a screw 33, which is intended to extend through a reinforcing part 34 of the foundation plate 2. The foundation plate 2 for the rest is made of concrete, which has been cast around the reinforcing part 34. The height of the screw 33 relative to the foundation plate 2 can be adjusted by means of a nut 35, so that by this arrangement the framework can be levelled independently of the foundation plates being at a somewhat different height in relation to each other.

Figure 2:
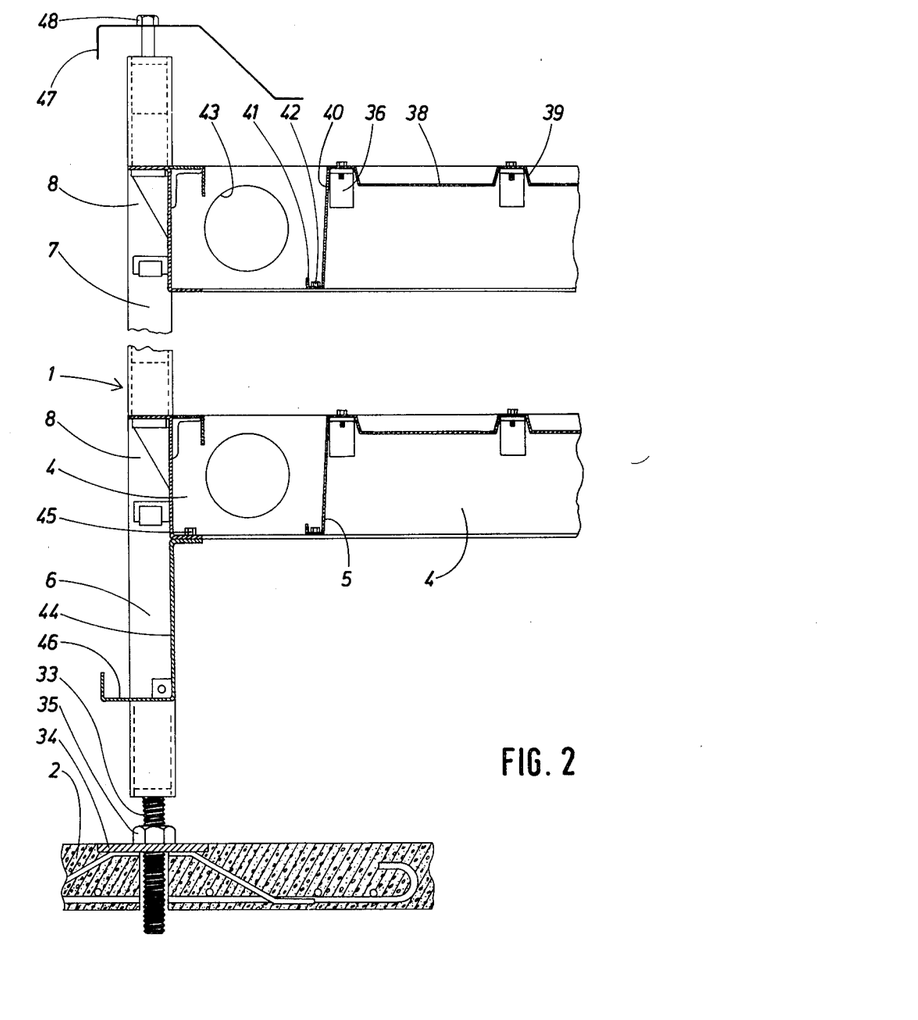
FIG. 2 is a partly broken side elevational view of a framework.

It should moreover be mentioned that the beams 4 (see FIG. 2) support a number of brackets 36 serving the purpose to support the floor structure elements 5. There are moreover a number of holes 37 taken up in the lower flanges of the beams 4. The floor structure elements are designed as channel beams with a web 38, which is provided with three chuteshaped bends 39 and two flanges 40, which terminate in edge flanges 41. The chuteshaped bends 39 are fitted to rest against the brackets 36, and the edge flanges 41 exhibit holes, which fit to the holes 37, so that the edge flanges 41 and the flanges 11 of the beams 4 can be attached to each other by means of bolts 42. The beams 4 suitably exhibit a number of holes 43 for the leading-through of conduits. The framework moreover exhibits a number of covering elements. Thus, according to FIG. 2 Z-shaped covering plates 44 occupy a position underneath the beams 4, which covering plates are attached to the lower flanges 11 of the beams 4 by means of bolts 45. The covering plates 44 exhibit a lower flange 46, which is fitted for connection to a facade lining. The uppermost uprights 7 can at the upper end support an edge plate 47 for the base of the roof. This plate can be attached to the upwards projecting bars 20 and thus suitably by their being provided with an inner thread, in which a fastening screw 48 is fitting.

As is evident from FIG. 1 the uprights and the beams of the framework form a number of open square openings. These openings must be divided up in smaller areas for the fitting of windows and doors. This takes place by means of vertical columns 47 (FIG. 10) and horizontal intermediate beams 48. These elements are made of tubular profiles. The vertical columns in this arrangement at one side at their upper end exhibit a pair of keyhole-shaped openings 49, similar to the holes 46, each hole on its side of a central hole 50. Pins 51 with grooves are attached to the beams, which pins are similar to the pins 18, and in pairwise arrangement surround a central pin 52. The pins 51 and 52 are attached to the web 9 of the beams 4, whereas the upper flange 10 exhibits a number of holes 53, which occupy a position right in front of the pins 51, 52, when the beams are mounted. The columns 47 exhibit in addition to the holes 49, 50 mentioned at their opposite end a pin 54. A number of pairwise arranged holes 55 are provided along the columns. The intermediate beams are on the other hand provided with pullocks 56, which can be manoeuvred through holes 57 in the side of the beams profile.

When mounting a framework, the foundation plates 2 are first put in place on the foundation 3. As mentioned, they can occupy a position directly on the ground, when the same has a firm structure, or else they can be placed in excavated pits of shallow or deeper depth. It is also possible to let the plates rest on plinths or piles and they can also be substituted by a complete construction of cast concrete. When the base construction is finished, the upright elements 6 are put in place with their bolts 33 in the holes of the reinforcing elements 34, and a course levelling is carried out by means of the nuts 35, so that all of the upright elements have their upper ends on approximately the same level. The lower beams 4 are subsequently mounted, so that a frame is formed with the upright elements 6 as supporting legs. The beams 4 are simply mounted by their plates with their holes 16 being slipped over the pins 18, whereby they will rest in recessed condition between the corner portions 32 of the uprights. When mounting the beams, the corresponding dog 22 shall be swung-out and the recess 15 in the plate 14 will then fit to the dog, as is shown to the left in FIG. 3. In this manner the beams 4 will get rigid supports at their ends and this for the support itself of the beams as well as the fixation of their position, so that they cannot swing. The frame now formed can be further levelled into exact position by means of the nuts 35.

Figure 6:
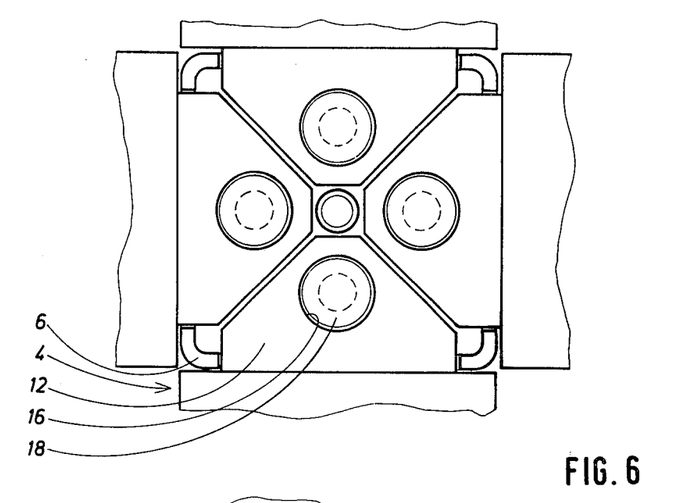
FIGS. 6 and 7 are a top view and a cross-sectional view respectively of the coupling device as seen in two different positions, the cross-section being taken along the line VII—VII in FIG. 3.

The first store of the framework is now formed, and now the upright elements 7 shall be erected, if the framework shall have one or several floors. However, as is hinted in FIG. 1, certain parts of the frame are intended to comprise only the first floor, and at these points can for example balconies be built. Before fastening of the upper upright element 7, the upper end of the upright element 6 exhibits the appearance, as is shown in FIG. 6. Thus the plates 12 of the beams 4 are suspended on the pins 18, and the beams project straight out from the sides of the upright profile. The pins 18 and the bar 20 extend in upwards direction above the plate 12. In FIG. 6 four beams connected with the upright element are shown, but also one, two or three beams can instead be connected. If less than four beams are connected, a washer is laid on the pins 18 not used. The washer shall have the same thickness as the plate 12. The upper upright 7 is according to FIG. 7 with the larger circular portion of its holes 26 slipped down over the pins 18, the equal upright profiles being displaced by approximately 45° relative to each other. The plate 25 of the upper upright will then rest against the plates 12 and the washers mentioned respectively. The plate 25 exhibits corners, which are cut off in such a manner that the plate can pivot inside of the corner portions 31. As mentioned, these corner portions project in upwards direction above the end of the upper upright. The upright element can thus be turned and the movement is carried out with such an angle that the sides of the upright elements are in line with each other. Then also the ends of the narrower portions of the holes 26 strike against the waist of the pins 18 in the grooves 19. As can easily be understood, the upper surface of the plate 25 is then behind the flange ending the groove 19, and the upright is by this arrangement firmly held. During the pivoting movement the bar 20 serves the purpose of a guiding means.

Figure 8:
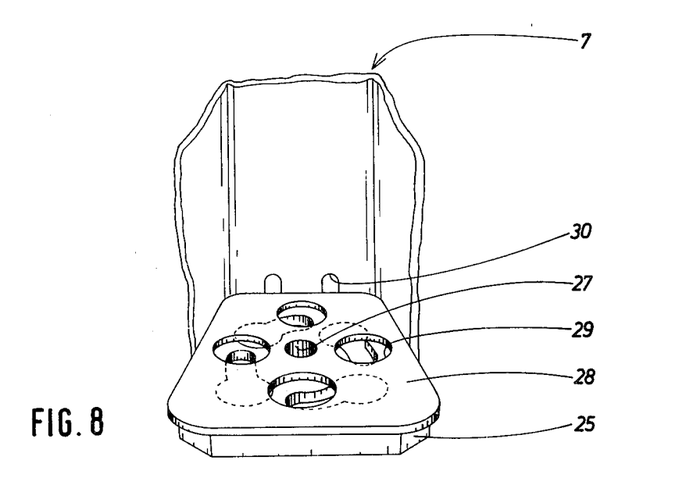
FIG. 8 is a partly broken exploded view of a coupling device.
Figure 9:
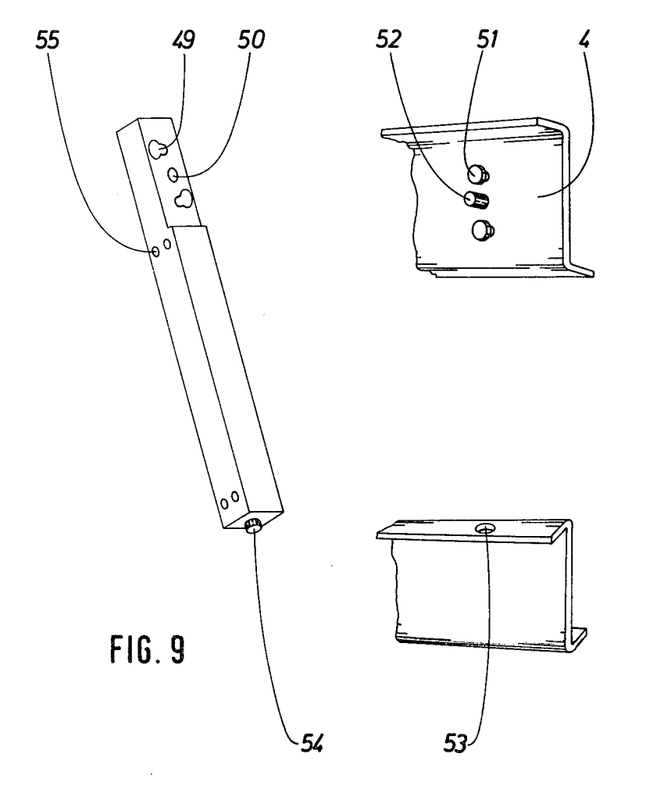
FIGS. 9 and 10 are perspective views of a detail of the framework in two mounting positions.

When the upper upright element 7 is first slipped over the pins into its position, which relative to the lower upright element exhibits an angular displacement, the ends of the pins are right in front of the plate 28 (see also FIG. 8) at the side of its holes. This means that the plate 28 is lifted by the pins. However, when the upright element has been turned into its locking position, the pins will be right in front of the holes 29, and the plate 28 falls down over the pins. The upright element is thereby locked so that it cannot be turned and again be released from the lower upright element. However, if one wishes to turn back the upright element for demounting purpose, the plate 28 can be lifted by inserting a pointed forkshaped tool through the openings 30. The now described function is clearly evident, if one looks at the FIGS. 6, 7 and 8. FIG. 8 shows the ends of the two uprights with beams and coupling device immediately before the now described mounting operation.

Figure 10:
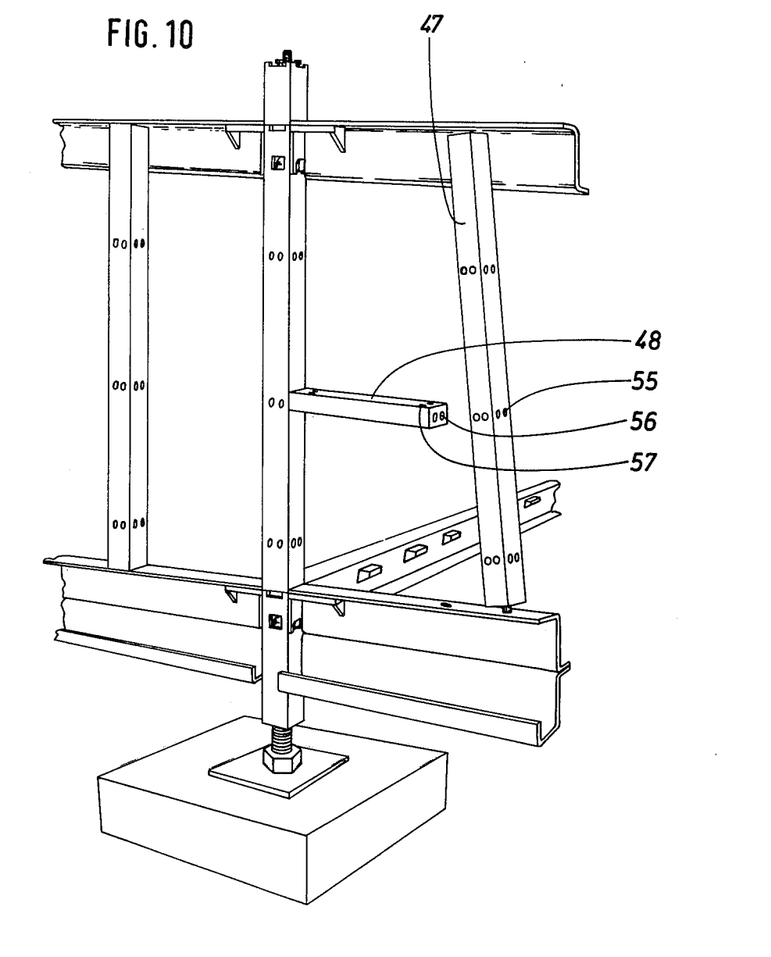

When fastening the columns 47 they are pivoted into the position illustrated in FIG. 10, whereby the keyhole-shaped openings 49 with their wider portions can be slipped over the pins 51. The pin 52, which is introduced into the hole 50, then functions as a guiding means. If the column now is pivoted into a vertical position, the narrower portion of the openings 49 will lock against the pins 51 provided with a groove. At the end of its movement the projecting pin 54 will engage the lower beam 4. However, this beam is calculated to have a certain yielding capacity, and the column can therefore be pivoted against the overcoming of a spring force until the pin 54 snaps in into the hole 53. The pins 51 then also occupy their locking positions in the narrower ends of the openings 49.

As to their length the intermediate beams 48 are adapted to the distance between the upright elements 7 and the columns 47 or the distance between two columns 47, between which elements they are introduced with the bolts of the locks retracted. After the intermediate beams 48 have been fitted in and positioned right in front of the pairwise arranged holes 55, the bolts are pushed out, and the intermediate beams will be hanging on the projecting bolts, which are inserted into the holes 55.

The floor structure elements, as should have been evident from the foregoing description of the brackets 36 on the beams 4, rest on the beams 4 and connect to the lower flanges 11 with their edge flanges 41. The fixation takes place by means of bolts and the nut 42, which extends through the holes 37 and through the edge flanges 41. The brackets 36 can moreover be provided with holes for attachment by means of screwing of the floor structure elements.

In the manner described the desired framework is built out to the required size and shape. Several floors can then be installed by adding further upright elements 7, which are attached to the upper ends of the underlying uprights in the manner that has been described and employing the coupling devices 8. The number of columns 47 and intermediate beams 48 depends upon the number of openings in the facades and partition walls. Two intermediate beams are generally required for a window, one in the upper edge and one in the lower edge of the window, whereas a door opening generally requires one intermediate beam at the upper edge.

After the completion of the framework, surface covering elements shall be put in place. Thus, the floor tructure elements support floor elements for the forming of the floor surfaces and ceiling elements for the forming of the ceilings. An insulation can be introduced between the floor- and ceiling elements. In the squares formed by the beams 4 and the upright elements 7 facade elements and windows and doors respectively shall be inserted. Partition wall elements, in its case with doors, shall be inserted into the inside squares. These wall elements shall either be completed in the form of totally finished blocks or be inserted in the form of several layers of comprising panels. The panels may have different characters according to their function to form the outer facade, the inner wall or a heat and sound insulation between the outer layers. The windows and doors are suitably in the form of finished elements including the sash belonging to them, which can be inserted in the openings made. Said sash can then suitably be equipped with draught preventers on its outside, which directly tightens the element to the surrounding edges of the intended opening. The roof is suitably formed by roof elements resting on the upper floor structure elements and equipped with suitable tightening connecting means. The supplementing arrangements now indicated for the completion of the framework of a finished building is, however, not the subject of the present application and will therefore not be further described.

INDUSTRIAL APPLICABILITY

The now described framework according to the invention is in the first place intended to be made of steel, whereas the additional elements mentioned for the finishing of the building can comprise panel-shaped materials based on wood or plastics. However, it is obvious that steel or aluminum sheeting can be used for by way of example facades and roofs. Besides steel also other metals as light metals can in special cases be used for all or certain ones of the elements of the framework. Depending upon the material the manner, in which the elements are erected can to a certain degree be varied in addition to what has now been described, where it has been presumed that the work for forming of the beams and uprights with their coupling devices essentially involves welding.

I claim:

1. In a building framework system having a foundation supporting a number of vertical uprights in the longitudinal direction divided into elements joined to the ends of each other to form a respective complete upright, a number of substantially horizontal beams provided for the support of areas forming floor structure elements at least partly positioned above each other to form several stories of the building, which beams are provided at their ends for supporting the same by the upright elements and joining the same together with the respective upright, and coupling means at the points where the upright elements are joined together and including coupling elements for attaching of the ends of the respective upright elements to each other and elements for supporting the beams connected to the coupling means, the improvement wherein the upper end of the lower upright element in the respective joint between two upright elements is permanently provided with the supporting elements for the beams at right angle to each other and further provided with a first part of the element for attaching the ends of the upright elements to each other and cooperating with a second part at the lower end of the upright element positioned as an upper element in the joint between the two upright elements, the end of said lower upright element being provided with projecting pins forming at least a part of the supporting elements for the beams, which beams are provided with projecting flanges arranged to rest against the ends of the upright elements and provided with holes cooperating with the pins for fixation of the respective beams, said pins forming at least a portion of said first part of the element for attaching the ends of the upright elements to each other.

2. A system according to claim 1, wherein the pins are provided with projecting surfaces which are arranged to cooperate with surfaces on the lower end of said upper upright element for attaching of the ends of the upright elements to each other.

3. A system according to claim 2, wherein the surfaces on the pins form a groove in the pin outside of which the pin is formed as a projecting flange with the second part of said attaching element in the form of an end plate of said upper upright element with holes, said holes being provided with an enlarged portion, which can be slipped over the flange of the respective pin and a narrow portion, which is larger than the dimension of the pin in said groove and positioned in such manner that the upper upright element with its end plate can be pushed onto the pins with the same positioned in the enlarged portion of the holes and then being attached to the lower upright element by being turned so that the narrower portion of the holes are positioned in said groove with the inner side of said end plate, forming said surface, resting against said outer surface of the respective groove.

4. A system according to claim 1, wherein a second plate is positioned at the side of the end plate, directed towards the upright element which second plate is locked against pivoting relative to the end plate and is provided with a number of holes, which are positioned to be slipped over the flanges of the pins, when the pins are in the narrow portion of the holes of the end plate, the second plate being arranged to be lifted up by the pins, when the pins are inserted through the enlarged portion of the holes of the end plate in order to pass over the pins, when they have reached the narrow portion of said holes and thus are positioned in front of the holes of the second plate, so that the upright elements will be locked against turning movement relative to each other as a result of the cooperation between the pins and against the pivoting locked plate.

5. A system according to claim 4, wherein the upright elements are provided with a number of openings in their walls, through which openings the second plate can be lifted from the pins in order to nullify said locking.

6. A system according to claim 1, wherein said projecting portion of the beams at the upper end of said beam and by the lower edge of the beams at their ends is provided with a supporting element, which is arranged to rest against a hook on the side of the upright element, which hook is projecting from the side of the upright element.

7. A system according to claim 6 wherein the hook projects through an opening in the side of the upright element and said hook is pivoted in such a manner that it can be swung inside of said side through said opening.

8. A system according to claim 1 wherein columns parallel to the uprights extend between the horizontal beams, which columns on their side at one of their ends are provided with holes having a wider portion and a narrow portion, whereas the side of the beam has pins with an outer projecting flange, so that the column with its wider portion of the holes can be slipped over the flanges of the pins and by displacement be locked to the pins, so that the narrow portions of the holes are inside of the flanges of the pins.

9. A system according to claim 8, wherein the holes in the side of the columns are of a circular shape and are arranged in such a manner that the column with the wider portions of the holes can be slipped over the pins into a pivoting position and be locked by the narrow portions of the holes being moved behind the flanges by turning into a position parallel to the uprights, the respective opposite ends of the uprights being arranged to be locked to a second beam by cooperation between at least one pin and a corresponding hole.

* * * * *